United States Patent Office 2,865,225
Patented Dec. 23, 1958

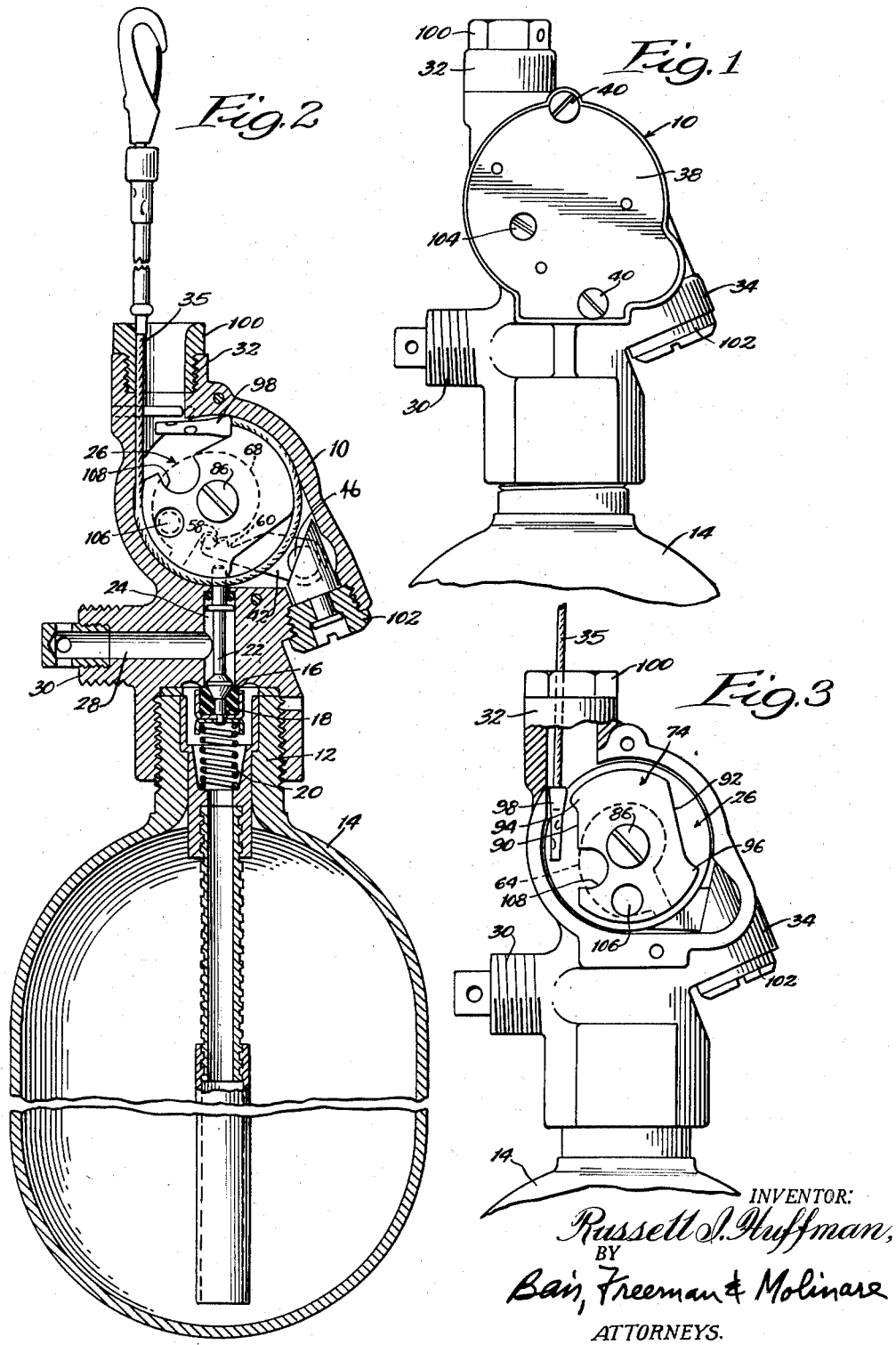

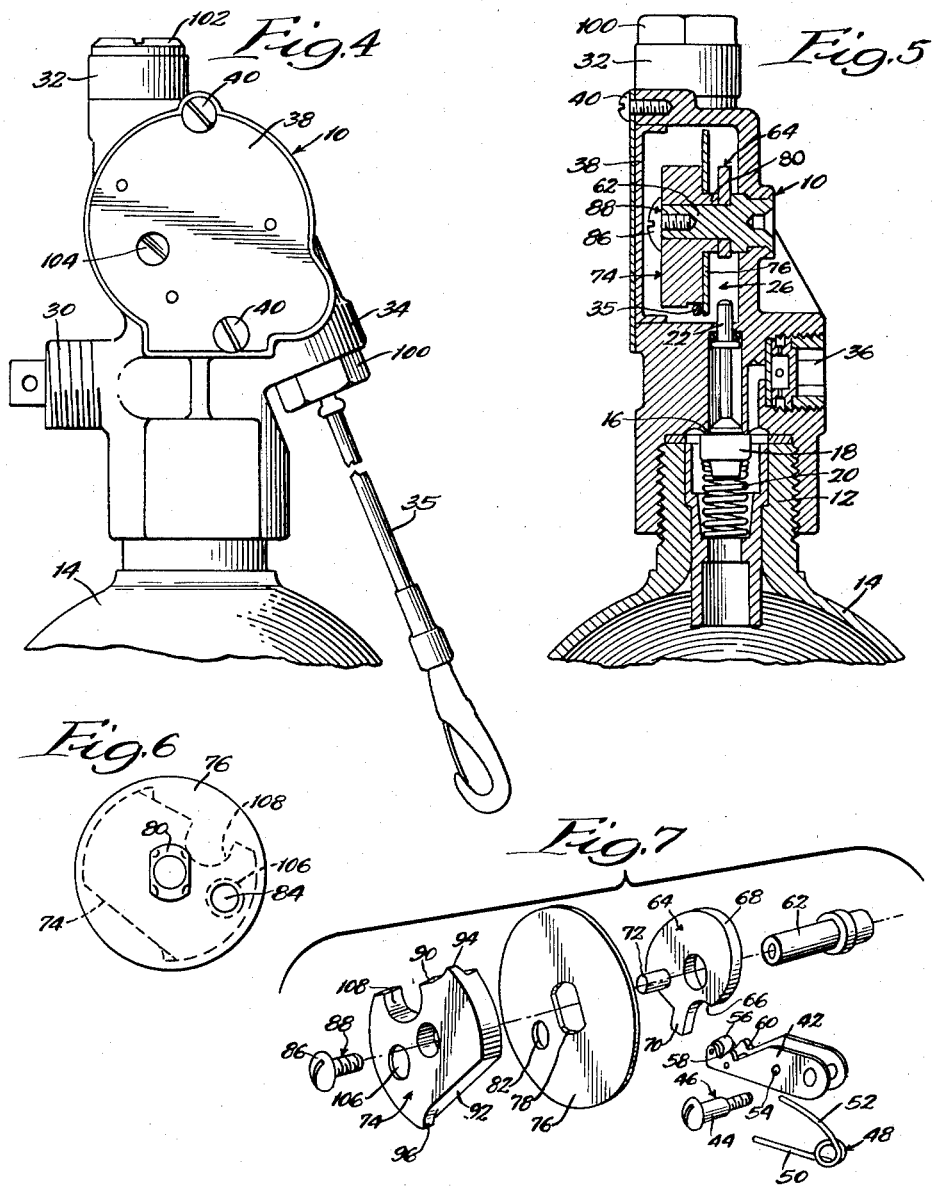

2,865,225

PLURAL SELECTIVE POSITION CAM ACTUATOR FOR VALVES

Russell I. Huffman, Dover, Ohio, assignor to Knapp-Monarch Company, St. Louis, Mo., a corporation of Delaware Application December 20, 1954, Serial No. 476,134

3 Claims. (Cl. 74—501)

This invention relates to improvements in a plural selective position cam actuator for valves, and more particularly relates to improvements in the device shown in United States Patent No. 2,630,018.

The control device of the present invention is particularly adapted for use with containers for fluid medium under pressure, such as carbon dioxide, employed for inflating life rafts and the like, although the use of the present invention is, by no means, restricted to that particular use.

There has been used, heretofore, cam actuators for valves for releasing fluid medium that is kept in containers under pressure, and said cam actuators have been provided with means for operating said cams comprising a sheave, connected to and rotatable with said cam, and a pull cable wrapped around said sheave.

In providing cam actuators of the above type for use with inflatable life rafts and the like which are normally closely packed, or are stored in close quarters, there exists the problem of providing a cam actuator with the inflatable life raft of a type that may be most easily and conveniently operated. Thus, in order to avoid situations where the packing of the life raft, or storing thereof, positioned the pull cable in an awkward or inaccessible position, or in a position where jamming of the pull cable might occur by reason of bending of the pull cable, there was provided a pair of cam actuators wherein the pull cables thereof were positioned for operation in substantially diametrically opposite directions, it being considered that a pair of opposite pull directions satisfied the requirements of providing an operable safety unit.

Of course, the use of a pair of cam actuators was wasteful and inefficient, as when one cam actuator was properly positioned for use the other actuator was not positioned for use. An early mechanical design attempt to alleviate this inefficiency led to a cam actuator design which included a single cam actuator housing provided with a pair of substantially oppositely facing pull cable openings therein, and a sheave member in combination with the cam, which sheave member was selectively positionable, during assembly of the actuator, in a pair of positions relative to the cam, whereby the sheave could be selectively positioned for operation with a pull cable which extended through one or the other of said pull cable openings in said housing.

The latter arrangement further required the provision of beveled guide means on the sheave to cooperate with the cable to permit of threading of the cable into the housing through a pull cable opening in the housing.

It is an object of this invention to provide a plural selective position cam actuator for valves which includes a sheave member connected to the cam means, which sheave member is positionable in but a single position and provides thereon means for connection to a pull cable that may be selectively operated from either of said plural selective positions.

Another object of this invention is to provide a plural selective position cam actuator for valves which avoids the necessity of providing a selectively positionable sheave member, thereby providing an actuator that is of uniform design, and requires the uniform assembly of the sheave and cam means regardless of the selective position from which the pull cable is to be actuated, thereby obviating possible errors in the assembly of such devices.

A further object of this invention is to provide a plural selective position cam actuator for valves which eliminates the necessity of beveled guide means on the sheave thereof.

And another object of this invention is to provide a new and improved plural selective position cam actuator for valves which attains all of the above objectives and which is characterized by its simplicity and inexpensiveness of construction, and efficiency of operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a side elevation view of the plural selective position cam actuator for valves;

Fig. 2 is a longitudinal section view, partly in elevation, of the control device of this invention shown secured to a container for storing fluid medium under pressure and showing the pull cable and sheave prior to actuation of the cam means;

Fig. 3 shows the positions of the pull cable and sheave after operation of the cam means shown in Fig. 2 and shows the arrangement of parts at the point where there is release of the pull cable from the sheave;

Fig. 4 shows the plural selective position cam actuator with the pull cable positioned for operation from the position alternate to the operating position shown in Figs. 2 and 3;

Fig. 5 is a sectional view partly in elevation, taken at right angles to the view shown in Fig. 2;

Fig. 6 is an elevation view of one side of the sheave and plate sub-assembly; and Fig. 7 is an exploded view of the sheave, and cam actuator parts.

Referring now to the drawings there is shown a plural selective position valve housing 10 threaded to the neck 12 of a container 14 for a fluid pressure medium, such as carbon dioxide. The valve housing 10 defines a valve seat 16 therein against which a valve member 18 is normally held by means of a spring 20 and by the pressure of the fluid medium within the container 14.

The valve member 18 has a stem 22 extending upwardly therefrom through a passageway 24 formed within housing 10 and into a chamber 26 formed within said housing. A discharge passageway 28 communicates with passageway 24 and extends through a boss 30 that is exteriorly threaded for attachment to a connection (not shown) which leads to the interior of an inflatable life raft (not shown).

The housing 10 is provided with a pair of substantially oppositely facing bored bosses 32 and 34 which provide a pair of openings therethrough located at a pair of selective attitudes from which a pull cable 35 may be drawn from the housing 10. Figs. 2 and 4 compare the attitudes assumed by the pull cable 35 as it emerges through said pairs of openings in the bosses 32 and 34. The housing 10 is also provided with a pressure relief valve means generally indicated at 36, which, however, forms no part of this invention.

The control means for actuating the valve member 18 are supported within chamber 26 of housing 10. Said chamber 26 opens through one side of housing 10. A cover plate 38 is provided for closing said open side of chamber 26, and said cover plate is retained on housing 10 by means of threaded bolts 40.

Referring now to the controls within the chamber 26 of housing 10, there is a stem engaging member 42 that is normally positioned above the upper end of stem 22, as shown in Fig. 2, which member 42 is pivotally mounted on the unthreaded enlarged shank portion 44 of a thread bolt member 46 which is adapted to thread into a tapped bore in the housing 10. Said stem engaging member 42 is normally maintained in the unoperated position shown in Fig. 2 by means of a spring 48 which slips over the enlarged shank portion 44 of bolt member 46. The spring 48 is operative to engage housing 10 through leg 50 of said spring, and the leg 52 of the spring is adapted to be disposed under a pin 54 carried by the member 42.

Said stem engaging member 42 carries at its extended end a rotatably mounted roller 56. The upper edge of said member 42 is shaped to define a first notch 58 and a second notch 60, the purposes of which will become apparent as this description proceeds.

Extending into the chamber 26 is a pivot pin 62 that is fixedly mounted on the housing 10. Pivotally mounted on pin 62 is a cam 64 that is positioned to engage the roller 56 on the stem engaging member 42, to thereby actuate said member 42. The cam 64 has a first projection 66 which is adapted to fit into the first notch 58 when the cam 64 and member 42 are in their normal, unoperated position. Beginning with the projection 66 and extending around the periphery of cam 64, there is a cam surface 68 that increases spirally in spacing from the axis of pin 62, and it is this surface of the cam which, when moved along roller 56, causes the stem engaging member 42 to move downwardly into engagement with the stem 22 to depress same and unseat the valve member 18 from the valve seat 16 to permit flow of fluid under pressure from the container 14 through passageways 24 and 28 into the life raft for inflating the life raft.

There is a second projection 70 on cam 64 which is adapted to seat in the second notch 60 to lock the cam 64 and the member 42 in an open valve control position, with the stem engaging member 42 in a position depressed from that shown in Fig. 2. The cam 64 also has a pin 72 extending therefrom.

There is a sheave sub-assembly within chamber 26, and this sheave sub-assembly includes a sheave member 74 and a plate 76. The plate 76 has a central aperture 78 therein through which extends a central annular stud 80 that extends from the sheave member 74. The stud 80 is adapted to be peened over as shown in Fig. 6, to secure the plate 76 and sheave member 74 together as a unit.

The plate 76 is apertured at 82 and the sheave member 74 is recessed to define, when said aperture 82 is in register with said recess, as shown in Fig. 6, a bore 84 for receiving therein the pin 72 on the cam 64, thereby providing an operative connection between the cam 64 and sheave 74 by means of which the two are caused to rotate together about pin 62.

The sub-assembly including the sheave member 74 and the plate 76 is slipped onto pin 62 and is retained in position thereon by the head 86 of a threaded bolt 88 which threads into the tapped end of the pivot pin 62.

The sheave member 74 is formed with a pair of spaced flat portions 90 and 92 in the periphery thereof. Each flat portion 90 and 92 has a leading and trailing end, as related to the direction of rotation of the sheave member during the operation of said cam means, which rotation as viewed in Figs. 2 and 3 is clockwise. At the leading end of said flat portions 90 and 92 there is provided, respectively, a shoulder 94 and 96, each of which extends transversely to its associate flat portion. The shoulders 94 and 96 are spaced from plate 76, and, in combination with said plate 76, define centrally located peripheral notches or recesses in which the pull cable 35 is positioned when wrapped around the sheave member 74.

When the sheave member 74 is positioned prior to actuation thereof, as shown in Fig. 2, said flat portions are dimensioned and so arranged and disposed that the trailing ends of each flat portion 90 and 92 are positioned opposite one of the apertures in said housing which extends through said bosses 32 and 34.

Referring now to the cable, said cable 35 has an elongated rigid anchor 98 at one terminal end thereof which is adapted to be disposed adjacent one of said flat portions of the sheave, in engagement with the associate shoulder transverse of said flat portion. When said cable is wrapped around said sheave 74 in operative condition, in the manner as shown in Fig. 2, the rigid anchor 98 engages the shoulder 94 that is positioned transverse of the flat portion 90.

Said rigid anchor 98 is shown to be formed substantially in the form of a frustum of a cone with the smaller section thereof located at the terminal end of the cable and with the larger section thereof adapted to be in engagement with one of said shoulders 94 and 96. The tapering form of the rigid anchor 98 provides that when the sheave member 74 is in the inoperative position shown in Fig. 2, and with the cover plate 38 of the housing 10 removed, the pull cable 35 may be assembled onto the sheave by inserting the pull cable, anchor end first, through the aperture in the boss 32 so that the tapered rigid anchor engages the sheave member 74 adjacent the trailing edge of the flat portion, thus permitting the tapered anchor 98 to be directed outwardly through the open side of the housing 10, where the anchor may be grasped to permit wrapping of the pull cable 35 around the sheave member 74 and disposing the anchor 98 adjacent the appropriate flat portion 90 or 92, to thereby locate the pull cable 35 in position appropriate for operation thereof.

As shown in Fig. 3, the sheave member 74 is caused, during operation of the cam 64, to rotate a distance sufficient to position the shoulder 94, against which the anchor 98 was positioned in Fig. 2, sufficiently far away from the opposite wall of housing 10 to permit escape of the anchor 98 out through the opening in boss 32.

Similarly, the flat portion 92 and the shoulder 96 are arranged to permit proper positioning of the anchor 98 when the cable 35 is inserted through the bore in boss 34, and to permit escape of the anchor 98 out through said bore in boss 34 upon actuation of the sheave member 74.

Depending upon which of the two selected attitudes is to be used from which the pull cable 35 is to be drawn, there is provided a threaded annular round-mouth insert 100 that is threaded into the boss through which the cable is to be drawn, and there is also provided a threaded plug member 102 which is threaded into the boss which is unoperative. Thus, in Fig. 2, the plug 102 is inserted in boss 34 while the annular insert 100 is threaded into boss 32, while in Fig. 4, the plug 102 is inserted in boss 32 while the annular insert member 100 is inserted in boss 34.

The cover plate 38 is apertured and provided with a window 104 through which indicia means may be visible for indicating the condition of the sheave and cam means within the housing 10. The sheave member 74 is provided in one face thereof with a green circular spot 106, which green spot is aligned with the window 104 when the sheave member 74 is in the normal unoperated position. A cut-out 108 is provided in the sheave member 74 and is positioned so as to be aligned with the window 104 when the sheave member 74 has been operated to the position shown in Fig. 3. By paintaining the plate 76 red, the cut-out portion 108 provides for the viewing of a red marker through the window 104 after the sheave member 74 has been moved to the "operated" position.

It will be noted that the single arrangement of the green spot 106 and the cutout 108, together with red plate 76, operates to indicate the status of the sheave member 74 and cam means within the housing 10, regardless of whether the cable means 35 is being operated through the bore in boss 32 or through the bore in boss 34, thereby providing a single arrangement of parts which is operative to indicate the condition of the sheave, regardless of which of the two selected attitudes of operation is being utilized.

While there has been shown and described a particular embodiment of this invention, it will be obvious to those skilled in the art that various changes and modifications may be made therein without departing from the invention, and therefore, it is intended in the appended claims to cover all such changes and modifications as fall within the true spirit and scope of the invention.

What I claim as new, and desire to secure by Letters Patent of the United States, is:

1. In a pull-cable operated fluid release control device for effecting movement of closure opening means, which control device is provided in a housing equipped with a pair of substantially oppositely disposed apertures for selectively accommodating said pull-cable; the improvement comprising, in combination, a rotatable sheave in said housing adapted to have said pull-cable wrapped therearound, cam means secured to said sheave and adapted to operate said closure opening means upon said pull-cable being pulled, said sheave being formed with a pair of spaced flat portions in the periphery thereof, said flat portions having leading and trailing ends, as related to the direction of rotation of said sheave during operation of said cam means, shoulders on said sheave extending transversely of each said flat portion at the leading end thereof, said sheave with cam means secured thereto being so disposed in said apertured housing, when said cam means is in its initial unactuated position, and said flat portions on said sheave being so dimensioned and disposed that the trailing end of each said flat portion on the sheave is positioned opposite one of said apertures in the housing, said cable having an elongated rigid anchor at one terminal end thereof adapted to be disposed adjacent a flat portion of the sheave and in engagement with the associate shoulder transverse of said flat portion when said cable is wrapped around said sheave in operative condition, and means on said sheave projecting radially of said cable for limiting displacement of said cable in both directions axially of said sheave.

2. In a pull-cable operated fluid release control device for effecting movement of closure opening means, which control device is provided in a housing equipped with a pair of substantially oppositely disposed apertures for selectively accommodating said pull-cable; the improvement comprising, in combination, a rotatable sheave in said housing adapted to have said pull-cable wrapped therearound, cam means secured to said sheave and adapted to operate said closure opening means upon said pull-cable being pulled, said sheave being formed with a pair of spaced flat portions in the periphery thereof, said flat portions having leading and trailing ends, as related to the direction of rotation of said sheave during operation of said cam means, shoulders on said sheave extending transversely of each said flat portion at the leading end thereof, said sheave with cam means secured thereto being so disposed in said apertured housing, when said cam means is in its initial unactuated position, and said flat portions on said sheave being so dimensioned and disposed that the trailing end of each said flat portion on the sheave is positioned opposite one of said apertures in the housing, said cable having an elongated rigid tapered anchor at one terminal end thereof adapted to be disposed adjacent a flat portion of the sheave and in engagement with the associate shoulder transverse of said flat portion when said cable is wrapped around said sheave in operative condition, and said rigid tapered anchor cooperating with the trailing end of said flat portion, during the assembly of said control device when said cable is threaded through the associate aperture in said housing, to facilitate gripping the cable and wrapping the same around the sheave.

3. In a pull-cable operated fluid release control device for effecting movement of closure opening means, which control device is provided in a housing equipped with a pair of substantially oppositely disposed apertures for selectively accommodating said pull-cable; the improvement comprising, in combination, a rotatable sheave in said housing adapted to have said pull-cable wrapped therearound, cam means secured to said sheave and adapted to operate said closure opening means upon said pull-cable being pulled, said sheave being formed with a pair of spaced flat portions in the periphery thereof, said flat portions having leading and trailing ends, as related to the direction of rotation of said sheave during operation of said cam means, shoulders on said sheave extending transversely of each said flat portion at the leading end thereof, said sheave with cam means secured thereto being so disposed in said apertured housing, when said cam means is in its initial unactuated position, and said flat portions on said sheave being so dimensioned and disposed that the trailing end of each said flat portion on the sheave is positioned opposite one of said apertures in the housing, and means on said sheave including said transverse shoulders defining spaced cable restraining means which bound a central recessed groove in the periphery of said sheave in which said cable is located when wrapped around said sheave.

References Cited in the file of this patent

UNITED STATES PATENTS

| | | |
|---|---|---|
| 1,782,020 | Allen et al. | Nov. 18, 1930 |
| 1,945,715 | Wiswell | Feb. 6, 1934 |
| 2,538,787 | Manhartsberger | Jan. 23, 1951 |
| 2,607,581 | Love et al. | Aug. 19, 1952 |
| 2,630,018 | Hannant | Mar. 3, 1953 |
| 2,710,547 | Davenport | June 15, 1955 |